Dec. 15, 1925
C. W. TODD
1,565,761
TRUCK FOR RAILROAD ROLLING STOCK
Filed Jan. 22, 1925
2 Sheets-Sheet 1
-FIG. 1.-
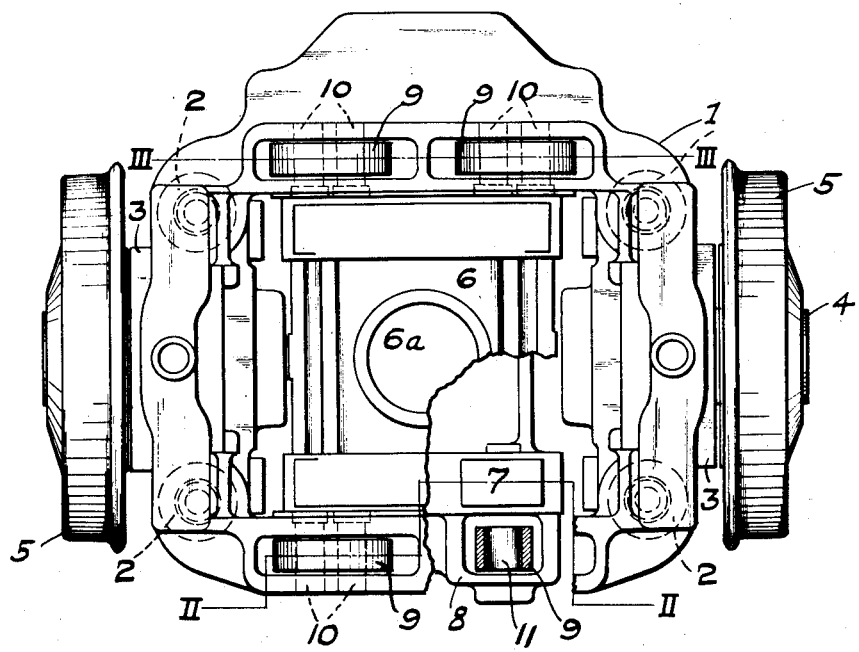
-FIG. 2.-
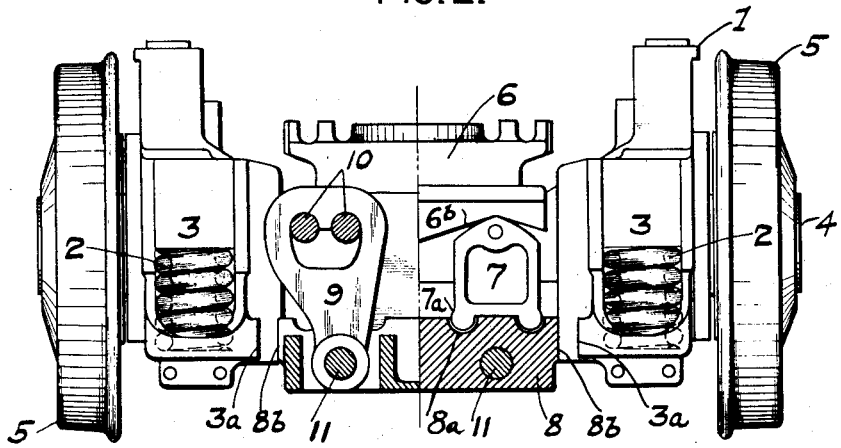
INVENTOR
Charles W. Todd,
BY
Clarence Kerr
ATTORNEY Dec. 15 1925

1,565,761

C. W. TODD

TRUCK FOR RAILROAD ROLLING STOCK

Filed Jan. 22, 1925

2 Sheets-Sheet 2

INVENTOR
Charles W. Todd
BY
Clarence D. Kerr
ATTORNEY

Patented Dec. 15, 1925.

1,565,761

UNITED STATES PATENT OFFICE.

CHARLES W. TODD, OF SCHENECTADY, NEW YORK.

TRUCK FOR RAILROAD ROLLING STOCK.

Application filed January 22, 1925. Serial No. 3,896.

*To all whom it may concern:*

Be it known that I, CHARLES W. TODD, a citizen of the United States, residing at Schenectady, Schenectady County, New York, have invented a new and useful Improvement in Trucks for Railroad Rolling Stock, of which the following is a specification, reference being had to the accompanying drawings, in which—

Figure 3:
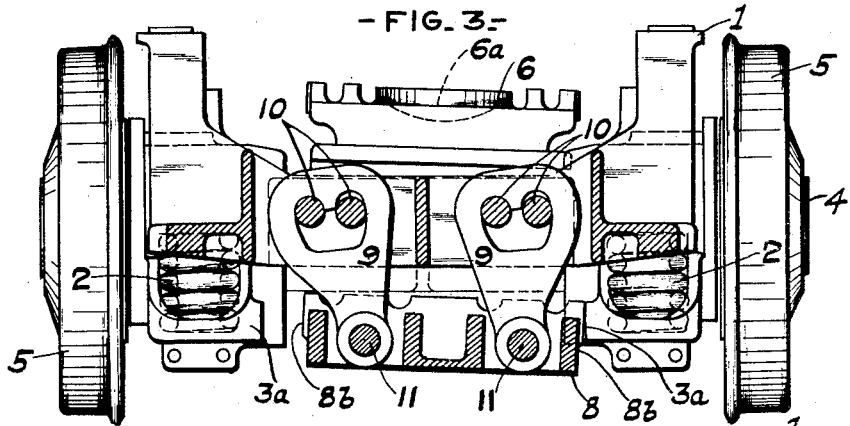
Figure 4:
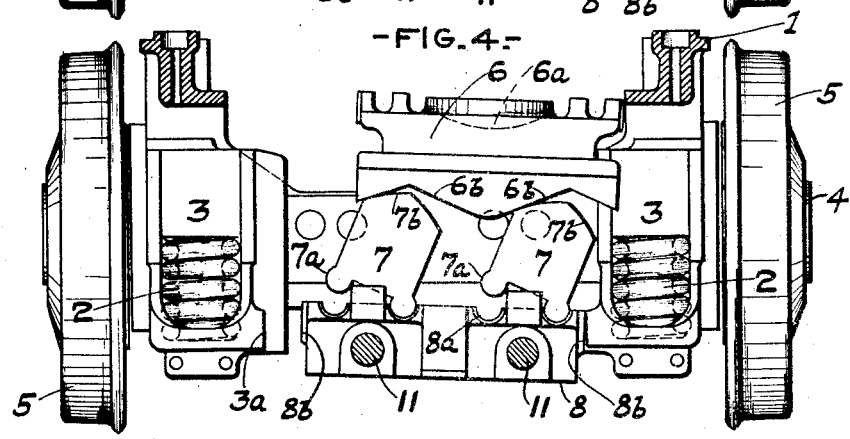
Figure 5:
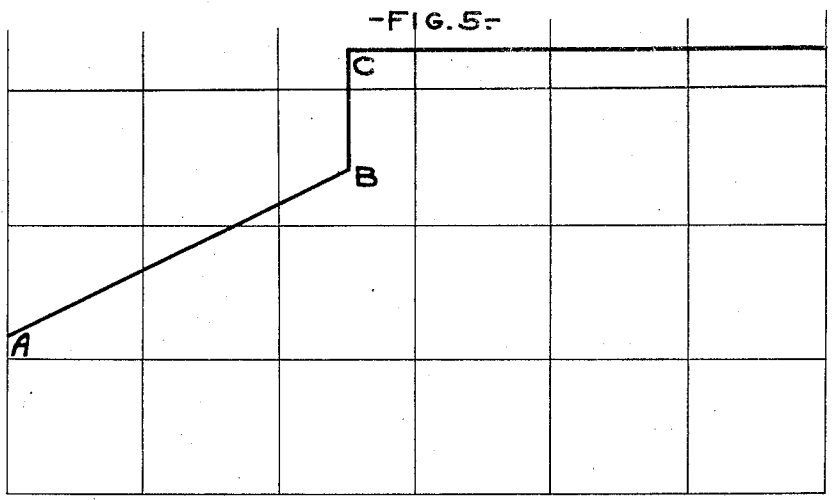

Figure 1 is a top plan view, partly in section, of a two-wheeled locomotive truck, illustrating the application of my invention thereto; Fig. 2 is a vertical transverse section along the line II—II of Fig. 1; Fig. 3 is a vertical transverse section along the line III—III of Fig. 1, showing the bolster displaced toward the right hand to the limit of the initial stage of its movement, on the swing hanger links; Fig. 4 is a sectional elevation of Fig. 1, showing the bolster in its maximum displaced position toward the right; Fig. 5 is a diagram showing the resistance characteristics of the truck illustrated in Figs. 1 to 4, inclusive. The ordinates of this diagram measure the lateral resistance, while the abscissæ measure the lateral displacement of the bolster from the center.

My invention relates to trucks for railroad rolling stock, of the class or type in which lateral-resistance devices are provided. The object of my invention is to provide means for establishing a marked increase in the degree of lateral resistance which the leading truck of a wheel-base arrangement, having trucks at both ends, exerts as compared with the lateral resistance of the truck at the other end of the wheel-base, when acting as a trailing truck while the first-named truck is acting as a "leading" truck. As a result the combined effect of the two trucks, in assisting the guiding of the rigid wheel-base around curves, will be increased. An example of the wheel-base arrangement referred to is that known as the 2—8—2 type, in which the sequence of wheel grouping is as follows: two truck wheels; eight driving wheels; two truck wheels. In a wheel-base arrangement of this description, which is designed for operation in either direction, each truck acts alternately as a leading or trailing truck, depending on the direction of motion of the wheel-base at the given time, and my invention provides that when a truck is a "leading" truck it will have a marked increase in the lateral resistance it exerts over that which it has when it is a "trailing" truck.

Lateral resistance devices as applied to the trucks of a locomotive engine are for the purpose of bringing the bolster back to the central position from which it is displaced on curved track; and of assisting the leading flange of the driving wheel-base in guiding the engine around curves, this being accomplished by the reaction of the truck through the bolster and center pin on the engine structure. When there is a truck at both ends of the rigid wheel-base the truck which is acting as a trailing truck opposes and partly nullifies the guiding action of the leading truck. It is therefore desirable to make the lateral resistance of the leading truck greater than that of the truck which is trailing at the time, so that the net guiding effort will be thereby increased.

I have observed that a wheel-base structure in passing a curve tends to assume a skew position between the rails, the rear end tending to pull in toward the inner rail, so that the trailing truck has a lesser displacement than that of the leading truck. I take advantage of this feature in my invention, and so design the truck that the initial displacement of the bolster gives a resistance which is less at any point than that during the final stage.

My invention also comprises the various features which I shall hereinafter describe and claim.

My invention is herein exemplified as applied to a two-wheel locomotive truck of the swing and lateral motion type in which as in practice a swing frame or bolster support 1 is supported, through the intermediation of springs 2 on journal boxes 3 mounted on an axle 4, on which the truck wheels 5 are secured. The swing frame 1 extends from one to the other of the side members of the truck frame and is preferably made integral therewith. The weight carried by the truck is primarily applied thereto through a floating or swing bolster 6 which is provided with a center plate 6ª suitably recessed in the top for the reception of a center pin or spindle.

The bolster 6 has V shaped bearings 6ᵇ on its under surface which rest on the cam surfaces of rockers 7. The rockers 7 terminate at their lower ends in the journals 7ª which seat in the correspondingly shaped recesses 8ª of the rocker support 8. This support 8 is suspended on swing hanger links 9, each of which is journaled on a pair of pins 10 secured in the swing frame 1, and on a pin 11 in the rocker support 8. The lateral movement of the rocker support 8 is limited by stops 8ᵇ on the rocker support and 3ª on the journal boxes The latter stops, however, may be located on any other suitable part of the truck structure. The relative lateral resistance of the swing hanger links 9 and rockers 7 is preferably so proportioned that the initial lateral forces required to displace the rockers 7 from the central position is substantially greater than the lateral resistance of the hangers 9 at any point during their travel from the central position, this travel being limited by the stops 3ª as hereinbefore described. The operation of the truck is as follows:

During the first portion of the lateral travel of the bolster 6 from the center position until the support 8 engages the stops 3ª, the bolster, its supporting rockers 7 and the rocker support 8 maintain the relative positions shown in Fig. 2, while all of these parts move laterally on the hangers 9, each hanger turning about one or the other of the pins 10 in the swing frame, depending on the direction of travel. When the bolster has deflected laterally so that the support 8 engages the stops 3ª, as is shown in Fig. 3, the lateral movement of the support is arrested and any further movement of the bolster away from the central position results in the movement of the rockers 7, as shown in Fig. 4, in which one of the cam surfaces 7ᵇ of each rocker has rotated about one of its journals 7ª and also along the surface 6ᵇ of the bolster.

A characteristic curve illustrating the relation between the lateral displacement of the bolster measured in inches and the percentage of the vertical load which appears as lateral resistance as a result of the displacement of the bolster from central position, is shown in Fig. 5. Thus an initial resistance of 12% is indicated by the point A. This increases to 24% at B during a bolster movement of 2½ inches from the central position, which takes place on the swing hanger links, while the rockers remain stationary with respect to the bolster and the supporting bed. Any further movement of the bolster results in an increase of the resistance to 33% at C, due to the movement of the bed being arrested by the stops 8ᵇ and 3ª, 33% being the initial resistance of the rockers which begin to operate at this point. Further lateral displacement up to the limit of the six inches shown by the diagram gives the constant lateral resistance of 33% for the rockers.

It will be readily understood that I may vary the percentages of resistance referred to above or substitute other combinations of resistance devices without departing from the spirit of my invention. For example, the initial movement of the bolster may be taken on rockers and the final movement on swing hanger links, or rockers of suitable resistance characteristics may be employed for both stages. Similarly, swing hanger links of different characteristics might be employed in both stages, or other resistance means such as springs or rollers on inclined planes might be used.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In a railroad truck, the combination of a frame; a bolster adapted to traverse laterally relative thereto; and two lateral resistance elements, each arranged to operate separately during a portion of the lateral displacement of the bolster, the operation of said elements being in consecutive relation.

2. In a railroad truck, the combination of a frame; a bolster adapted to traverse laterally relative thereto; a transversely movable support; and two lateral resistance elements, one of which is disposed between the support and bolster and the other between frame and support, each element being arranged to operate separately during a portion of the lateral traverse of the bolster.

3. In a railroad truck, the combination of a frame; a bolster adapted to traverse laterally relative thereto; a transversely movable support; and two lateral resistance devices, one of which is disposed between the support and bolster and the other between frame and support, one comprising a plurality of rockers rotating between a supporting bearing and a supported bearing, each device being arranged to operate separately during a portion of the lateral traverse of the bolster.

4. In a railroad truck, the combination of a frame; a bolster adapted to traverse laterally relative thereto; a transversely movable support; and two lateral resistance devices, one of which is disposed between the support and bolster and the other between frame and support, one comprising a plurality of hangers swinging between a supporting bearing and a supported bearing, each device being arranged to operate separately during a portion of the lateral traverse of the bolster.

5. In a railroad truck, the combination of a frame; a bolster adapted to traverse laterally relative thereto; a lateral-resistance structure adapted to operate only during the initial portion of the lateral traverse of the bolster from its central position; a second lateral-resistance structure adapted to operate only during the final portion of the lateral traverse of the bolster from its central position; the lateral resistance exerted by the first structure at the end of the initial stage and the beginning of the final stage of lateral traverse of the bolster being not greater than that of the second structure at the same point in the transverse movement of the bolster.

6. In a railroad truck, the combination of a frame; a bolster adapted to traverse laterally relative thereto; a transversely movable support; and two lateral resistance elements, one of which is comprised of a plurality of rockers by which the bolster is carried on the support, and the other of a plurality of hangers by which the support is suspended from the frame.

7. In a railroad truck, the combination of a frame; a bolster adapted to traverse laterally relative thereto; a transversely movable support; cam rockers journaled in said support; inclined bearings on the bolster resting on the cam rockers; swing hanger links by which the support is suspended having their upper ends journaled in the truck frame and their lower ends journaled in said support; and stops on relatively fixed portions of the truck structure to limit the transverse movement of the rocker support on said hanger links to a portion of the total lateral traverse of the bolster; said bolster during the remaining portion of its lateral traverse swinging said cam rockers about their lower bearings and having a lateral movement relative to said rocker support.

8. In a railroad truck, the combination of a frame; a bolster adapted to traverse laterally relative thereto; and two sets of lateral resistance devices; each set being adapted to operate separately during a portion of the lateral displacement of the bolster, the operations of said sets of devices being in consecutive relation.

CHARLES W. TODD.